No. 614,360. Patented Nov. 15, 1898.
E. O. BARTLETT & C. V. PETRAEUS.
METHOD OF AND APPARATUS FOR PURIFYING AND SAVING METALLIC FUMES.
(Application filed June 21, 1893.)
(No Model.)
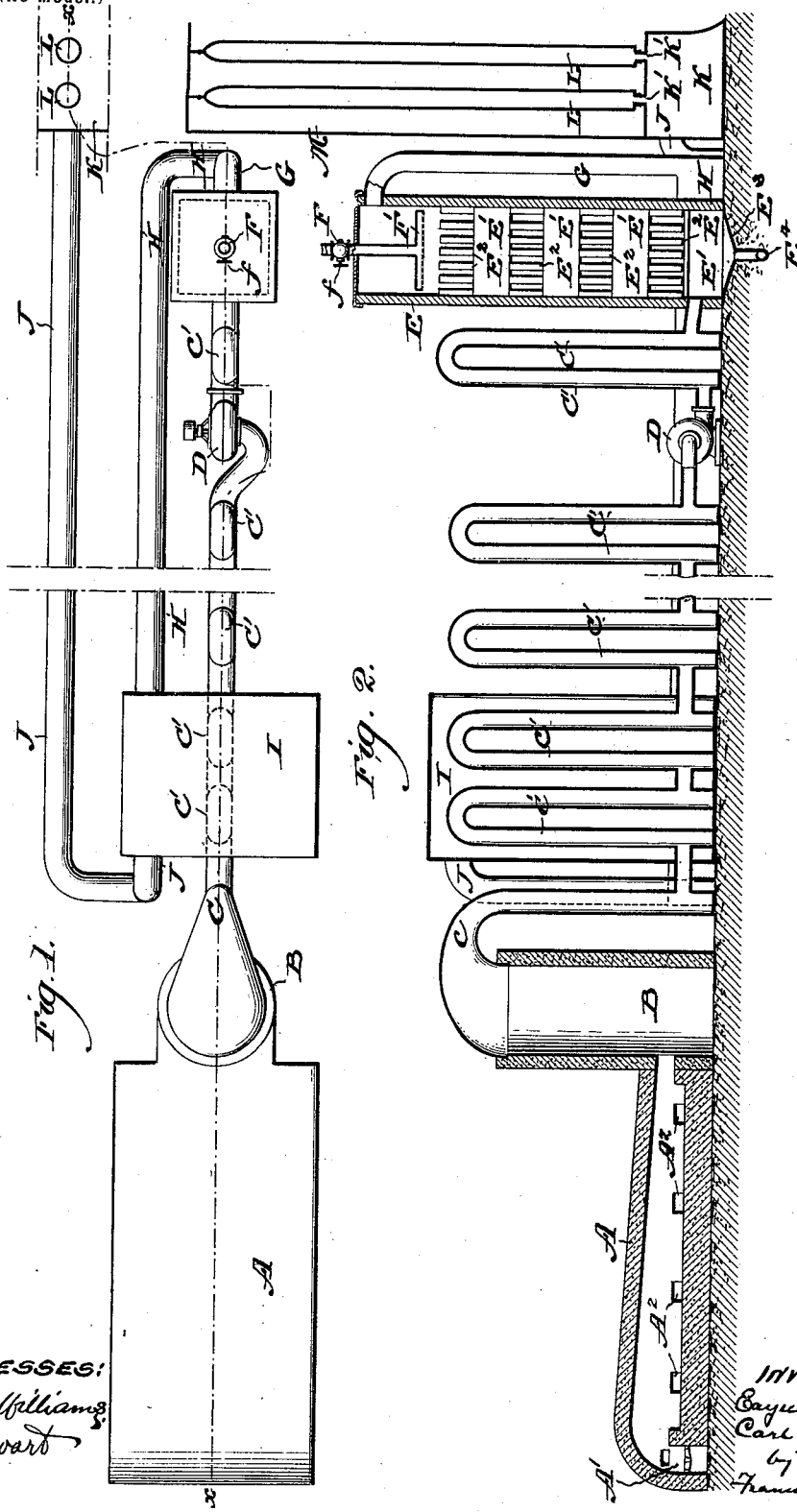

UNITED STATES PATENT OFFICE.

EAYRE O. BARTLETT AND CARL V. PETRAEUS, OF JOPLIN, MISSOURI, ASSIGNORS TO SAID BARTLETT AND OLIVER H. PICHER, OF SAME PLACE.

METHOD OF AND APPARATUS FOR PURIFYING AND SAVING METALLIC FUME.

SPECIFICATION forming part of Letters Patent No. 614,360, dated November 15, 1898.

Application filed June 21, 1893. Serial No. 478,323. (No model.)

*To all whom it may concern:*

Be it known that we, EAYRE O. BARTLETT and CARL V. PETRAEUS, citizens of the United States, residing at Joplin, in the county of Jasper, in the State of Missouri, have invented a certain new and Improved Method of and Apparatus for Purifying and Saving Metallic Fume, of which the following is a true and exact description, reference being had to the drawings, which form a part of this specification.

Our invention relates to the separation and saving of the fumes of lead and other metals which are driven off in the treatment of ores in various metallurgical furnaces, the object of our invention being to enable the metallic fume to be saved by means of fabric screens or bags with less danger of injury to the bags than has heretofore been the case and also to enable the fume contained in smoke, such as is given off from roasting or calcining furnaces, to be saved in the fabric screens.

Many methods and apparatus have been designed for the purpose of saving the metallic fume in furnace smoke, and of late years great success has been met with by a method which, briefly speaking, may be described as first carrying the smoke through a series of cooling-flues and then forcing it into muslin or woolen bags, which arrest the solid particles while permitting the gases to escape. This plan, while successful for many purposes, has proved unsatisfactory—indeed, impracticable—for the treatment of the smoke from roasting or calcining furnaces in which sulfid ores are treated, and the same trouble has been met with in attempting to use the system with chlorination furnaces, the strong mineral acids given off in such furnaces rapidly destroying the fabric screens. Even in cases where the mineral acids are not present in sufficient quantity to destroy the screens trouble is sometimes met with owing to the highly-combustible nature and finely-divided condition of the fume caught in the screens and to a certain extent deposited throughout the flue system, fires being of not unusual occurrence.

Now we have discovered that by first cooling down the smoke to a temperature of between 200° and 300° Fahrenheit and then causing it to pass through a tower or other portion, in which it is brought into intimate contact with water, but without passing through a body of water, the strong mineral acids present in the smoke will be absorbed into the water at least to a sufficient extent to prevent injurious action upon the fabric screens into which the smoke is subsequently passed, and we have further discovered that this treatment is useful even where the mineral acids are not present in dangerous quantity, as it affords a complete safeguard against fire reaching the screens and does not to a serious extent diminish the quantity of metallic fume which reaches the screen system, the object of first cooling the smoke before subjecting it to the action of the water being to prevent the absorption of water which would result if the intensely-heated smoke and fume were passed directly from the furnace to the water-tower, this being objectionable, as the water forms a mud with the fume and fills up the interstices of the screens in which the fume is caught. Preferably we reheat the smoke after subjecting it to the action of water—say to a temperature of 300° to 350° Fahrenheit—for the purpose of avoiding any condensation of moisture upon the screens, as obviously water present as such in the screens would form a mud with the solid particles of the smoke, which would fill the interstices of the fabric and prevent the screens from acting.

Reference being now had to the drawings which illustrate our invention, Figure 1 is a plan view of an apparatus embodying our new features of construction and adapted for use with our new process; and Fig. 2 is a side elevation of the same, taken on the section-line $x\,x$ of Fig. 1.

A indicates the smoke-generating furnace, and, as shown, is a reverberatory furnace such as are used for calcining sulfid ores, $A'$ indicating the grate, and $A^2$ the charging-openings, through which ore is introduced to the hearth.

B is a dust-chamber connected with the furnace A and in which the heavier particles issuing from the furnace are deposited in the form of flue-dust.

C indicates a flue leading from the dust-chamber B, and, as shown, is provided with a series of goosenecks C', the function of this flue being to cool down the gases to a proper point before they are subjected to further treatment.

D indicates an exhaust-fan, the function of which is to draw the smoke through the cooling-flue C C' and force it into the flues and screen system following.

E indicates a device formed of part of the flue system and in which the smoke is brought into intimate contact with water. Preferably we construct it, as shown, in the form of a masonry tower filled up with a series of boards $E'$ $E^2$, set on edge and each layer lying crosswise to the ones beneath and above it. Any other filling, however, having intercommunicating interstices may be used for the same purpose. The bottom of the tower E (indicated at $E^3$) communicates with a conduit $E^4$, which may lead to a settling-basin. (Not shown.) Into the top of the tower E leads a water-pipe F, having, preferably, a regulating-cock $f$ and a spraying-head F'. A rain of water is thrown into the top of the tower through this spraying-head and percolates down through the filling of the tower, but without filling the tower itself with water. Consequently smoke is free to pass upward through the intercommunicating interstices of the tower-filling while the water is passing downward through the same in the form of rain and thin films. The smoke is of course brought into intimate contact with the water and the mineral acids contained in the smoke are absorbed partly or wholly thereby, the solution being drawn off from the bottom of the tower. A certain amount of solid matter, fume, &c., will also be carried down by the water and can afterward be saved in settling-basins. The percentage of solid matter so separated from the smoke is not, however, large.

After passing through the water-tower the purified smoke can be at once passed to the fabric screens; but we have found it advisable to reheat it to prevent the drawbacks hereinabove noted, and for this purpose we carry the smoke from the top of the tower by the flue G to a flue H, which extends back along the cooling-flue and terminates in a chamber I, which is built around a portion, and preferably the hotter portion, of the cooling-flue C C'. From the chamber I the smoke, heated by contact with the cooling-flue, passes through the flue J to the screen system, as shown, entering a hopper K and passing upward through the openings in the top thereof into fabric bags, (indicated at L L.)

Having now described our invention, what we claim as new, and desire to secure by Letters Patent, is—

1. The method of separating and saving metallic fume contained in smoke from metallurgical furnaces, which consists in first cooling down the smoke out of contact with water to a temperature not exceeding 300° Fahrenheit for the purpose of precluding the vaporization of any considerable volume of the water with which it is subsequently in contact, then bringing the cooled smoke into intimate contact with cool running water, but without passing it through a body of the same, to eliminate strong mineral acids without vaporizing any considerable volume of water or separating any large proportion of metallic fume from the gaseous smoke, and finally screening the residual smoke rendered cool, dry and free from a dangerous quantity of strong acid by the preceding treatments to separate the solid particles.

2. The method of separating and saving metallic fume contained in smoke from metallurgical furnaces which consists in first cooling down the smoke, then bringing it into intimate contact with water but without passing it through a body of the same, to eliminate strong mineral acids, then reheating the smoke to prevent moisture in the screens and finally screening the residual smoke to separate the solid particles.

3. In combination with a metallurgical furnace, a cooling-flue leading therefrom for the escape of smoke, a fan for drawing the smoke through the flues provided for it, means for bringing the smoke into intimate contact with water said means being situated at the end of the cooling-flue aforesaid, a flue for conducting the smoke from the cooling-flue and partly inclosing the said cooling-flue, and a screen system connected therewith for separating solid particles from the gases in the smoke.

4. In combination with a metallurgical furnace, a cooling-flue leading therefrom for the escape of smoke, a fan for drawing the smoke through the flues provided for it, a tower E having a filling $E'$ $E^2$ arranged to have intercommunicating interstices and a water-jet F at the top, a flue H, I, J connecting with the tower and having a portion I placed to inclose a portion of the cooling-flue, and a screen system connected with said tower.

EAYRE O. BARTLETT.
CARL V. PETRAEUS.

Witnesses:
A. E. SPENCER,
R. C. MCCONNELL.